United States Patent
May

(10) Patent No.: US 8,664,942 B2
(45) Date of Patent: Mar. 4, 2014

(54) DISTANCE SENSOR

(75) Inventor: Lutz May, Berg (DE)

(73) Assignee: PolyResearch AG, Chur (CH)

( * ) Notice: Subject to any disclaimer, the term of this patent is extended or adjusted under 35 U.S.C. 154(b) by 472 days.

(21) Appl. No.: 13/041,609

(22) Filed: Mar. 7, 2011

(65) Prior Publication Data

US 2012/0056616 A1   Mar. 8, 2012

(30) Foreign Application Priority Data

Mar. 10, 2010  (EP) .................................. 10 156 122
Apr. 29, 2010  (EP) .................................. 10 161 493

(51) Int. Cl.
  *G01B 7/14*  (2006.01)
(52) U.S. Cl.
  USPC ................................. 324/207.17; 324/207.15

(58) Field of Classification Search
  USPC ....................................................... 324/207.17
  See application file for complete search history.

(56) References Cited

U.S. PATENT DOCUMENTS

| | | |
|---|---|---|
| 4,613,866 A | 9/1986 | Blood |
| 5,619,133 A | 4/1997 | Shank et al. |
| 5,747,996 A | 5/1998 | Fuchs |
| 6,211,666 B1 | 4/2001 | Acker |

FOREIGN PATENT DOCUMENTS

| | | |
|---|---|---|
| DE | 19 918 404 | 10/1999 |
| DE | 10 2006 017 275 | 10/2007 |
| DE | 10 2008 064 647 | 11/2010 |

*Primary Examiner* — Bot Ledynh
(74) *Attorney, Agent, or Firm* — Fay Kaplun & Marcin, LLP

(57) ABSTRACT

A sensor device for height measurement, air spring comprising a sensor device for height measuring and a corresponding method allowing determining the height also under rough conditions like noisy, dusty or vibrating environments.

8 Claims, 12 Drawing Sheets

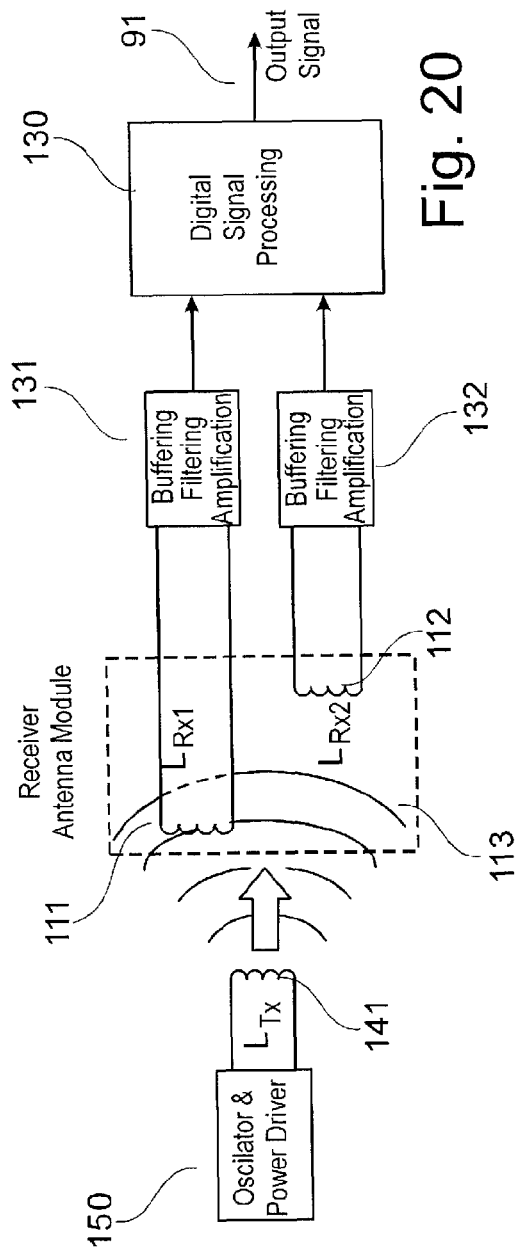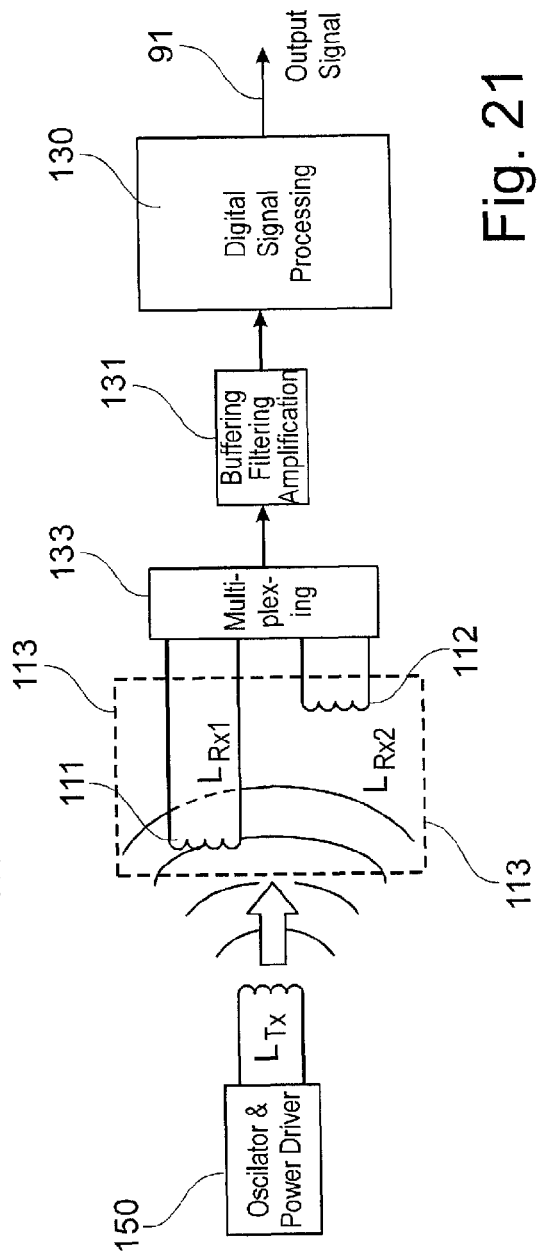

DISTANCE SENSOR

REFERENCE TO RELATED APPLICATIONS

This application claims the benefit of the filing date of EP Patent Application Serial No. EP 10 156 122.3 filed 10 Mar. 2010, the disclosure of which is hereby incorporated herein by reference and EP Patent Application Serial No. 10 161 493.1 filed 29 Apr. 2010, the disclosure of which is hereby incorporated by reference.

FIELD OF THE INVENTION

The present invention relates to a sensor device for height or distance measurement and an air spring for a vehicle having a sensor device for height or distance measurement.

BACKGROUND OF THE INVENTION

Height or distance measurement has a wide variety of possible application. However, the environment where the height measurement is to be conducted provides a lot of difficulties. In particular when applying a height measurement in the automotive technology, for example to measure a level of a vehicle frame with respect to the road or between the car chassis and the suspension beam, the environment of the height measurement, in particular the distance between the frame of vehicle and the road is very noisy, very dirty and provides high vibrations.

From DE 10 2006 017 275 A1 for example an air spring and a positioning of an air spring is known, wherein the distance between two parts of the air spring can be measured by an analogue proximity sensor. Commonly used proximity sensors are for example based on an ultrasonic measurement principle, which, however, is very sensitive in noisy and vibrating environments, as the acoustic noise and the ultrasonic measurement principle are based on the same physical principle, i.e. sound propagation.

Further, DE 10 2008 064 647 A1 describes an air spring for a vehicle having a measuring device, which measuring device may transmit data and energy via predetermined and fixed distance contactless.

SUMMARY OF THE INVENTION

The Invention provides a sensor device for distance or height measurement, and an air spring having a sensor device for distance or height measurement being capable of providing reliable results in particular in noisy, dirty and vibrating environments.

It should be noted that the following described exemplary embodiments of the invention apply also for the sensor device, the air spring and the method.

According to an exemplary embodiment of the invention, there is provided a sensor device for distance measurement, the sensor device comprises a magnetic field transmitting arrangement, a first magnetic field sensing arrangement for providing a first magnetic field signal, a second magnetic field sensing arrangement for providing a second magnetic field signal and a computation unit, wherein the first magnetic field sensing arrangement and the second magnetic field sensing arrangement are orientated to each other in a fixed predetermined manner to form a magnetic field sensing unit, wherein the magnetic field transmitting arrangement is movable with respect to the magnetic field sensing unit, wherein the first magnetic field sensing arrangement and the second magnetic field sensing arrangement are coupled to the computation unit for providing the first magnetic field signal and the second magnetic field signal, respectively, with the computation unit, wherein the computation unit is adapted to determine a relation between the first magnetic field signal and the second magnetic field signal, wherein the relation is an indicative of the distance between the magnetic field transmission arrangement and the magnetic field sensing unit.

Thus, the sensor may operate in harsh operating conditions and may be insensitive to potentially changing physical parameters, like changes in the operating temperature range, changes of electronic component tolerances, drifts, and aging effects, tolerating assembly tolerances in a relative wide sense, mechanical vibrations and shocks, and changes of light intensity, humidity, dust, air or fluid pressure.

According to an exemplary embodiment of the invention the magnetic field transmitting arrangement is movable with respect to the magnetic field sensing unit along a predetermined trajectory.

According to an exemplary embodiment of the invention at least one of the magnetic field transmitting arrangement, the first magnetic field sensing arrangement and the second magnetic field sensing arrangement comprises a coil.

According to an exemplary embodiment of the invention the magnetic field transmitting arrangement comprises a permanent magnet.

According to an exemplary embodiment of the invention at least one of the first magnetic field sensing arrangement and the second magnetic field sensing arrangement comprises a hall sensor.

According to an exemplary embodiment of the invention the first magnetic field sensing arrangement and the second magnetic field sensing arrangement have corresponding main receiving directions.

According to an exemplary embodiment of the invention the first magnetic field sensing arrangement and the second magnetic field sensing arrangement have a corresponding main receiving axis.

According to an exemplary embodiment of the invention, there is provided a sensor device for distance measurement, the sensor device comprises a first magnetic field transmitting arrangement for providing a first magnetic field, a second magnetic field transmitting arrangement for providing a second magnetic field, a magnetic field sensing arrangement for providing a first magnetic field signal according to the first magnetic field and a second magnetic field signal according to the second magnetic field, and a computation unit, wherein the first magnetic field transmitting arrangement and the second magnetic field transmitting arrangement are orientated to each other in a fixed predetermined manner to form a magnetic field transmitting unit, wherein the magnetic field transmitting unit is movable with respect to the magnetic field sensing arrangement, wherein the magnetic field sensing arrangement is coupled to the computation unit for providing the first magnetic field signal and the second magnetic field signal with the computation unit, wherein the computation unit is adapted to determine a relation between the first magnetic field signal and the second magnetic field signal, wherein the relation is an indicative of the distance between the magnetic field transmission unit and the magnetic field sensing arrangement.

The first and second magnetic field transmitting arrangements may transmit the magnetic field in an interleaving mode, i.e. time multiplexed, or at different characteristic frequencies, i.e. at the same time.

According to an exemplary embodiment of the invention the magnetic field transmitting unit is movable with respect to the magnetic field sensing arrangement along a predetermined trajectory.

According to an exemplary embodiment of the invention at least one of the first magnetic field transmitting arrangement, the second magnetic field transmitting arrangement and the magnetic field sensing arrangement comprises a coil.

According to an exemplary embodiment of the invention the first magnetic field transmitting arrangement and the second magnetic field transmitting arrangement have corresponding main transmitting directions.

According to an exemplary embodiment of the invention the first magnetic field transmitting arrangement and the second magnetic field transmitting arrangement have a corresponding main transmitting axis.

According to an exemplary embodiment of the invention the sensor device comprises a transceiving coil arrangement comprising the first magnetic field sensing arrangement for providing a first magnetic field signal and the second magnetic field sensing arrangement for providing a second magnetic field signal, a transmitting drive unit, a receiver unit comprising the computation unit, a reference coil arrangement comprising the magnetic field transmitting arrangement, a reference control unit, wherein the transceiving coil arrangement is coupled to both, the transmitting drive circuit and the receiver unit, wherein the reference control unit is coupled to the reference coil arrangement, wherein the reference coil arrangement is movably positioned with respect to the transceiving coil arrangement, wherein the drive unit is adapted to drive the transceiving coil arrangement with an AC power signal of a predetermined duration for generating a magnetic field, wherein the reference control unit is adapted for accumulating energy out of the generated magnetic field and for generating a reference signal based on an amount of the accumulated energy, wherein the receiver unit is adapted for receiving the reference signal and for outputting a signal for determining a distance between the transceiving coil arrangement and the reference coil arrangement based on the reference signal and/or the duration of the AC power signal.

According to an exemplary embodiment of the invention the sensor device comprises a transceiving coil arrangement comprising the magnetic field sensing arrangement for providing the first magnetic field signal according to the first magnetic field and the second magnetic field signal according to the second magnetic field, a transmitting drive unit, a receiver unit comprising the computation unit, a reference coil arrangement comprising the first magnetic field transmitting arrangement for providing the first magnetic field and the second magnetic field transmitting arrangement for providing the second magnetic field, a reference control unit, wherein the transceiving coil arrangement is coupled to both, the transmitting drive circuit and the receiver unit, wherein the reference control unit is coupled to the reference coil arrangement, wherein the reference coil arrangement is movably positioned with respect to the transceiving coil arrangement, wherein the drive unit is adapted to drive the transceiving coil arrangement with an AC power signal of a predetermined duration for generating a magnetic field, wherein the reference control unit is adapted for accumulating energy out of the generated magnetic field and for generating a reference signal based on an amount of the accumulated energy, wherein the receiver unit is adapted for receiving the reference signal and for outputting a signal for determining a distance between the transceiving coil arrangement and the reference coil arrangement based on the reference signal and/or the duration of the AC power signal.

According to an exemplary embodiment of the invention there is provided an air spring for a vehicle, the air spring comprising a fixed part and a movable part, a sensor device as described above, wherein the transceiving coil arrangement, the transmitting drive unit and the receiver unit are arranged at the fixed part of the air spring and the reference coil arrangement and the reference control unit are arranged at the moveable part.

The trajectory may be a straight or curved line. In case of using a plurality of magnetic field sensing units, each comprising at least two magnetic field sensing arrangements, or a plurality of magnetic field transmitting units, each comprising at least two magnetic field transmitting arrangements, the trajectory may also be an area. Main receiving axis may be the symmetrical axis of a cylindrical coil. Main receiving direction is the direction of the main receiving axis.

According to an exemplary embodiment of the invention, a sensor device for height measurement comprises a transceiving coil arrangement having at least one transceiving coil, a transmitting drive unit, a receiver unit, a reference coil arrangement, and a reference control unit, wherein the transceiving coil arrangement is coupled to both, the transmitting drive circuit and the receiver unit, wherein the reference control unit is coupled to the reference coil arrangement, wherein the reference coil arrangement is movably positioned with respect to the transceiving coil arrangement, wherein the drive unit is adapted to drive the transceiving coil arrangement with an AC power signal of a predetermined duration for generating a magnetic field, wherein the reference control unit is adapted for accumulating energy out of the generated magnetic field and for generating a reference signal based on an amount of the accumulated energy, wherein the receiver unit is adapted for receiving the reference signal and for outputting the signal for determining a distance between the transceiving coil arrangement and the reference coil arrangement based on the reference signal and/or the duration of the AC power signal.

Thus, the sensor device generates a magnetic field, in particular an inhomogeneous magnetic field, wherein the distance between the generating unit, i.e. a transceiving coil arrangement, and a field detecting unit, i.e. a reference coil arrangement can be determined based on the varying strength of the magnetic field depending on the distance between the transceiving coil arrangement and the reference coil arrangement. Transceiving means that the coil arrangement is adapted for both, transmitting and receiving. The predetermined duration may be a fixed duration or a variable duration, as will be explained below. Generally, it is possible to accumulate the energy out of the generated magnetic field until a certain amount of energy had been accumulated, so that the duration of the active magnetic field and the accumulated energy characterizes the distance between the transceiving coil arrangement and the reference coil arrangement. On the other hand, the energy may be accumulated for a fixed predetermined duration so that the strength of the reference signal may be used as a characteristic for the distance between the transceiving coil arrangement and the reference coil arrangement. As the AC power signal being responsible for generating the magnetic field is applied to the transceiving coil arrangement only for a predetermined duration, after the predetermined duration, the reference signal can be emitted so as to be received by the transceiving coil arrangement, so that the distance between the transceiving coil arrangement and the reference coil arrangement can be determined without the need for an additional device. Further, the transmitting and receiving can be carried out based on the same frequency level.

According to an exemplary embodiment of the invention, the reference control unit is adapted for receiving supply energy from the generated magnetic field for generating and supplying the reference signal.

Thus, it is not mandatory to provide the reference control unit with an external power supply so that no electrical connection of the reference control unit and the transceiving coil arrangement is necessary for operation. In particular, the reference control unit may be provided with an energy storing device providing the reference control unit with the required power for operation, i.e. for the accumulating of energy out of the generated magnetic field, the generation of a reference signal and the sending back of the reference signal to the transceiving coil arrangement and a receiver unit.

According to an exemplary embodiment of the invention, the reference coil arrangement is located off-centre of a main axis of the magnetic field generated by a transceiving coil arrangement.

Thus, the efficiency of the device can be increased, in particular as the magnetic field gradient with respect to a certain distance may be higher off-centre of a main axis of the magnetic field than along the main axis. In particular the magnetic field may be low or zero along the main axis of the magnetic field. Thus, when providing the reference coil arrangement off-centre, the entire sensor device can be made sensitive over a varying distance.

According to an exemplary embodiment of the invention, the transceiving coil arrangement comprises a plurality of equally angulated transceiving coils.

Thus, it is not only possible to gain the height distance, but also a lateral deviation of the centre axis or main axis. When providing for example three transceiving coils being equally angulated arranged, a kind of triangulation is possible in order to determine the position not only in her vertical direction but also in a horizontal direction. It should be noted that also two or four or more coils may be used.

According to an exemplary embodiment of the invention, at least a part of the transceiving coils of the transceiving coil arrangement is inclined with respect to the main axis of the reference coil arrangement.

Thus, the efficiency of the sensor device may be increased, as the field lines generally run not linear but along bended lines and in closed loops. Those closed loops off-centre of a main axis of the magnetic field have a direction being inclined with respect to the main axis of the magnetic field. Thus, inclining respective transceiving coils may lead to a straight passing of the magnetic field lines through the respective coil, thus increasing the efficiency of the sensor device. It should be noted that also at least a part of reference coils of the reference coil arrangement may be inclined with respect to the main axis of the transceiving coil arrangement, more or less leading to the same technical effect.

According to an exemplary embodiment of the invention, at least a part of the transceiving coils of the transceiving coil arrangement is wound around a magnetic core.

Thus, the core may be used for guiding the magnetic field lines, in particular for aligning the magnetic poles of the magnetic field.

According to an exemplary embodiment of the invention, the transceiving coil arrangement comprises two transceiving coils, each wound around a separate magnetic core for providing two electromagnets, wherein the magnetic cores are bended, wherein corresponding poles of the both electromagnets are arranged adjacently.

Thus, the bended magnetic cores can be arranged such that the centre of the sensor device can be kept free of any inventory, so that for example mechanically required components can be provided between the magnetic cores and the coils wound around the magnetic cores. In particular, when bending the magnetic core elements, the poles of each of the magnetic core elements can be provided adjacently, at the same time maintaining the free space between the magnetic core elements. Thus, corresponding poles of the electromagnets, i.e. both south poles can be arranged adjacently, so that the magnetic field lines propagate away from the south poles. At the same time, the north poles of the electromagnets can be arranged adjacently to achieve the same effect.

According to an exemplary embodiment of the invention, at least a part of the magnetic cores have two end faces, wherein the two end faces are substantially orthogonal with respect to an imaginary line between the two end faces.

Thus, in particular, when using bended magnetic core elements, the end faces are inclined over the longitudinal extension of the end section of the magnetic cores. End faces of adjacently arranged corresponding poles may be provided in the same plane so that it can be avoided that the magnetic field lines propagating from such an end face takes a shorter way to the counter pole end face of the same magnetic core element.

According to an exemplary embodiment of the invention, the receiver unit is connected to selected ones of the transceiving coils.

Thus, the receiver unit is connected to only one or only a part of the transceiving coils. Thus, it can be avoided that in particular when connecting the plurality of transceiving coils serially, the received reference signal will be extinguished owing to for example counter wise wounded coils each providing a received signal of different polarities.

According to an exemplary embodiment of the invention, an air spring for a vehicle comprises a fixed part and a movable part as well as a sensor device as described above, wherein the transceiving coil arrangement, the transmitting unit and the receiver unit are arranged at the fixed part of the air spring and the reference coil arrangement and the reference control unit are arranged at the movable part.

Thus, an air spring for a vehicle, for example for a lorry can be provided, a fixed part of which may be mounted to the frame of the vehicle, wherein the movable part being mounted to the axis of the vehicle. In this case the transceiving coil arrangement, the transmitting drive unit and the receiver unit are arranged at the fixed part of the spring, i.e. fixed relative to the frame of the vehicle, so that the power supply can be provided without any complications. The reference coil arrangement and the reference control unit, in particular when designed to not require a separate power supply, may be provided in the movable part, so that sensitive connections for transmitting electrical energy for a power supply or signals can be avoided.

According to an exemplary embodiment of the invention, a method for height measurement comprises driving a transceiving coil arrangement with an AC power signal of a predetermined duration for generating a magnetic field, accumulating energy by a reference coil arrangement out of the generated magnetic field, generating a reference signal and supplying the reference signal to the reference coil arrangement based on an amount of the accumulated energy, and receiving the reference signal and outputting a height signal for determining a distance between the receiving coil arrangement and the reference coil arrangement based on the reference signal and/or the duration of the AC power signal.

Thus, a method corresponding to the operation of the sensor device for height measurement can be provided being capable of measuring the height in an atmosphere or environment being loaded with dust, noise, and/or vibrations.

According to an exemplary embodiment of the invention, the AC power signal and the reference signal are of the same frequency.

Thus, the transmitting of the power signal and the receiving of the reference signal can be carried out by the same coil arrangement, i.e. the transceiving coil arrangement. In particular, no different adoptions for different frequencies are required for a transmitting and a receiving circuit.

According to an exemplary embodiment of the invention, the duration of the AC power signal is modified so as to maintain the received reference signal constant.

Thus, the signal strength of the reference signal can be maintained substantially unamended. In particular, the power signal iteratively can be modified so as to adapt the received reference signal to keep a predetermined constant value. This can be carried out by an automatic feedback controlling process being capable of feedback controlled adapting the duration of the AC power signal to arrive at a substantially constant reference signal.

According to an exemplary embodiment of the invention, the duration of the AC power signal is kept constant and the amplitude of the received reference sign is determined as a measure of the height to be determined.

According to an exemplary embodiment of the invention, the AC power signal is intermittently generated having breaks of a predetermined duration between two subsequent durations, wherein the reference signal is generated and supplied during the breaks.

Thus, it is possible to submit alternating either the AC power signal from the transceiving coil arrangement to the reference coil arrangement or the reference signal from the reference coil arrangement to the transceiving coil arrangement. In particular, this allows to maintain the same transmission frequency of the AC power signal and the reference signal, and to maintain the feedback control process of an iteratively adapting of the for example AC power signal duration. Further, it should be understood, that also the intensity of the AC power signal can be modified in order to conduct the height measurement, as far as the requirements for the accumulation of energy on the reference coil arrangement and reference control unit side are fulfilled.

It should be noted that the above features may also be combined. The combination of the above features may also lead to synergetic effects, even if not explicitly described in detail.

These and other aspects of the present invention will become apparent from and elucidated with reference to the embodiments described hereinafter.

BRIEF DESCRIPTION OF THE DRAWINGS

Exemplary embodiments of the present invention will be described in the following with reference to the following drawings.

FIG. 20 illustrates a principal parallel signal processing according to an exemplary embodiment of the invention.

FIG. 21 illustrates a principal multiplexed signal processing according to an exemplary embodiment of the invention.

DETAILED DESCRIPTION OF EXEMPLARY EMBODIMENTS

Figure 1:
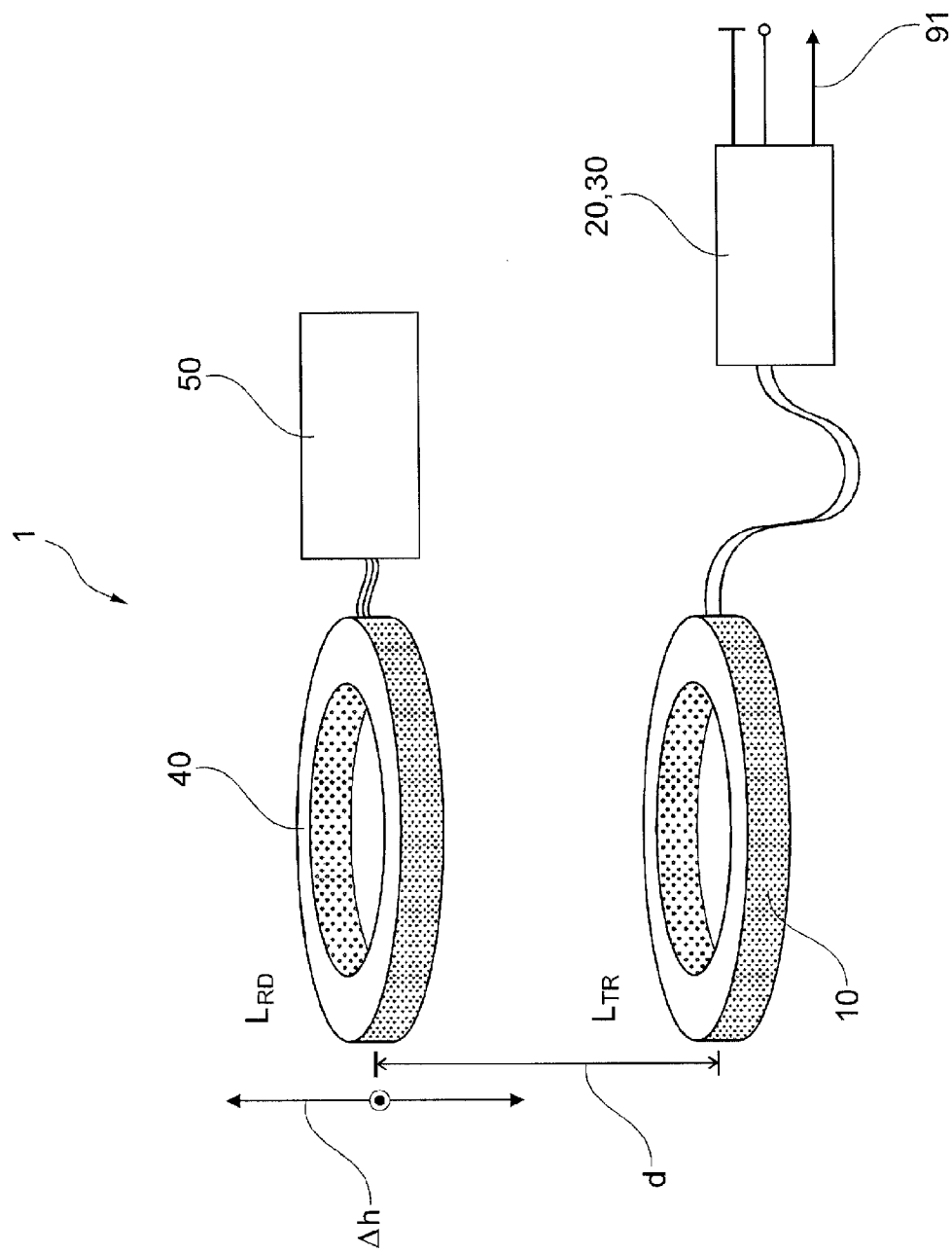
FIG. 1 illustrates a sensor device according to an exemplary embodiment of the invention.

FIG. 1 illustrates an exemplary embodiment of a sensor device according to the invention. The embodiment illustrated in FIG. 1 comprises a transceiving coil arrangement 10 having an inductivity $L_{TR}$, which is connected to both, a transmitting drive unit 20 and a receiver unit 30. It should be noted that the transmitting drive unit 20 and the receiver unit 30 can also be provided in two different units. The output of the receiver unit 30 includes an output 91 of a reference signal. In a certain variable distance d there is provided a reference coil arrangement 40 having an inductivity $L_{RD}$, being connected to a reference control unit 50. For the sensor device 1, the transceiving coil arrangement 10 may be connected to a fixed portion, wherein the reference coil arrangement 40 may be connected to a movable portion. The movable portion may have different heights h and can be moved in a certain range, for example within a range of Δh. The transceiving coil arrangement 10 may be for example a single coil, as illustrated in FIG. 1, wherein the reference coil arrangement 40 may also be in form of a single coil. The transmitting drive unit 20 provides the transceiving coil arrangement 10 here in form of a single transceiving coil with an AC power signal, so that the transceiving coil generates a magnetic field. The reference coil 40 is arranged in a distance d so as to be within the electromagnetic field generated by the transceiving coil 10. The magnetic field generated by the transceiving coil 10 induces a current within the reference coil 40, so that a certain amount of energy can be transferred from the transceiving coil 10 to the reference coil 40. The reference coil control unit 50 is adapted to accumulate the energy received by the reference coil 40, wherein the received energy is a measure of the distance d owing to the inhomogeneous magnetic field generated by the transceiving coil arrangement 10. If the reference coil 40 has a larger distance d, the induced current will be lower. It should be noted that the reference unit may also determine an integral of the current, without the need to store the energy. In other words, accumulation does not mandatorily require storing of the energy for measuring purposes. Nevertheless, the energy may be stored to supply power to the reference unit for determine, accumulating and back-transmitting the reference signal. Based on the generated reference signal and/or the duration of the AC power signal, the distance d between the transceiving coil arrangement 10 and the reference coil 40 can be determined. Instead of the duration also the intensity of the AC power signal may me modified. The reference signal includes information concerning the accumulated energy accumulated by the reference control unit, wherein the reference signal, emitted by the reference coil 40 can be received by the transceiving coil arrangement, so that the receiver unit can receive this reference signal in order to determine the distance between the transceiving coil 10 and the reference coil 40. A corresponding signal may be output via the output terminal 91 of the receiver unit 30.

Along with FIG. 2 and FIG. 3, the detailed procedure of generating an AC power signal and the reception of a reference signal will be described in detail.

Figure 2:
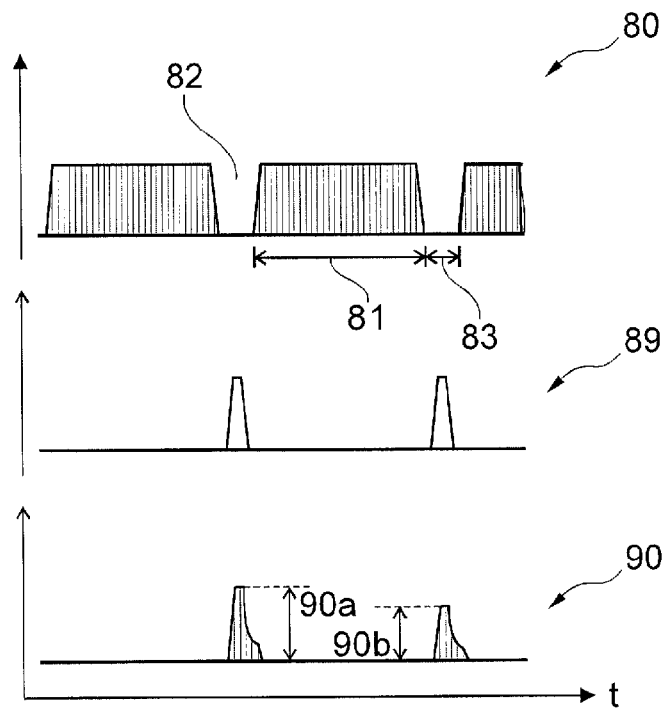
FIG. 2 illustrates a signal pattern according to an exemplary embodiment of the invention.

FIG. 2 illustrates the sequence of a plurality of AC power signals 80 each of which have the same predetermined duration 81. Between each of the AC power signals there is a break 82 having a break duration 83. The duration of the break 82, 83 specifies a timeslot 89 for transmitting back a reference signal 90. As can be seen from FIG. 2, the AC power signal 80 of a predetermined duration 81 will be transmitted from the transceiving coil 10 (see FIG. 1) for a predetermined duration and before starting with the subsequent following AC power signal, a predetermined duration 83 of a break 82 will be established to provide a timeslot 89 during which the reference signal 90 can be transmitted from the reference coil 40 to the transceiving coil 10. If the distance between the transceiving coil 10 and the reference coil 40 is small, the transmitted energy of the AC power signal is high, so that the reference signal 90 is high, as can be seen from the left reference signal 90a. However, if the distance d between the transceiving coil 10 and the reference coil 40 is large, the transmitted energy is respectively lower, so that also the reference signal 90 is of less intensity, as can be seen from the right reference signal 90b. Thus, the intensity of the reference signal can be used as a measure for the distance d between the transceiving coil arrangement 10 and the reference coil arrangement 40.

Figure 3:
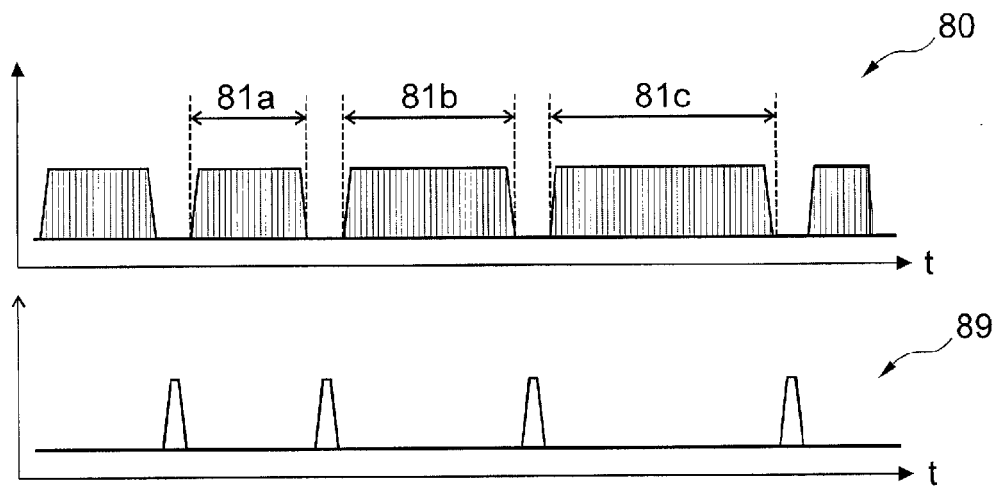
FIG. 3 illustrates an alternative signal pattern according to an exemplary embodiment of the invention.

FIG. 3 illustrates an alternative signal procedure, wherein the predetermined duration 81 of the AC power signals 80 is different and will be modified according to the distance d. Between each of the subsequent AC power signals 80, a break will be established to generate a time frame 89 for transmitting the reference signal 90. In case, the distance between the transceiving coil arrangement 10 and the reference coil arrangement 40 is small, the predetermined duration 81 can be kept low in order to receive a reference signal of a constant intensity. If the intensity of the received reference signal is lower than a predetermined threshold value, the subsequent AC power signal will be made larger according to a particular algorithm, so that the predetermined duration of the following AC power signal 81b for example is larger than the predetermined duration 81a of the previous AC power signal. After having received the corresponding reference signal of the AC power signal having a predetermined duration 81b, the intensity of the reference signal again will be determined, in order to evaluate, whether the next following AC power signal and the predetermined duration 81c of the next following AC power signal has to be extended or not. Thus, the predetermined duration 81a, 81b, 81c of the AC power signal will be subsequently modified according to the received intensity of the reference signal, wherein the predetermined duration 81a, 81b, 81c will be elongated in case the reference signal has an intensity lower than a predetermined threshold, wherein the predetermined duration of the AC power signal 81a, 81b, 81c will be shortened, if the reference signal has an intensity extending over a predetermined threshold. Thus, the predetermined duration 81a, 81, 81c can be used as a characteristic for the distance between the transceiving coil arrangement and the reference coil arrangement.

Figure 4:
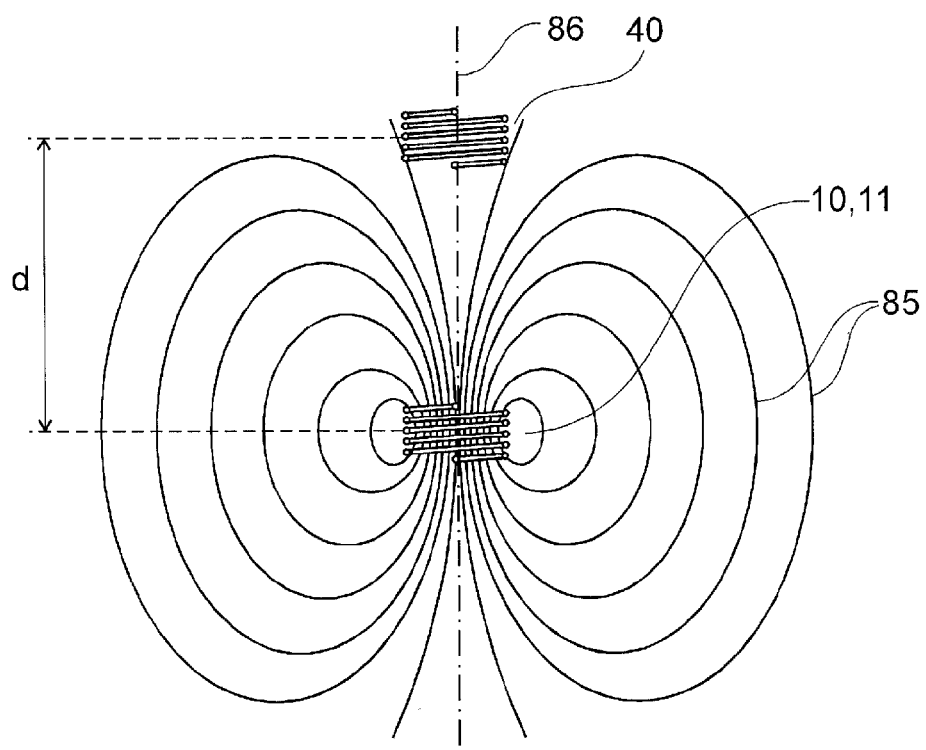
FIG. 4 illustrates a schematic arrangement of a transceiving coil arrangement and a reference coil arrangement according to an exemplary embodiment of the invention.
Figure 5:
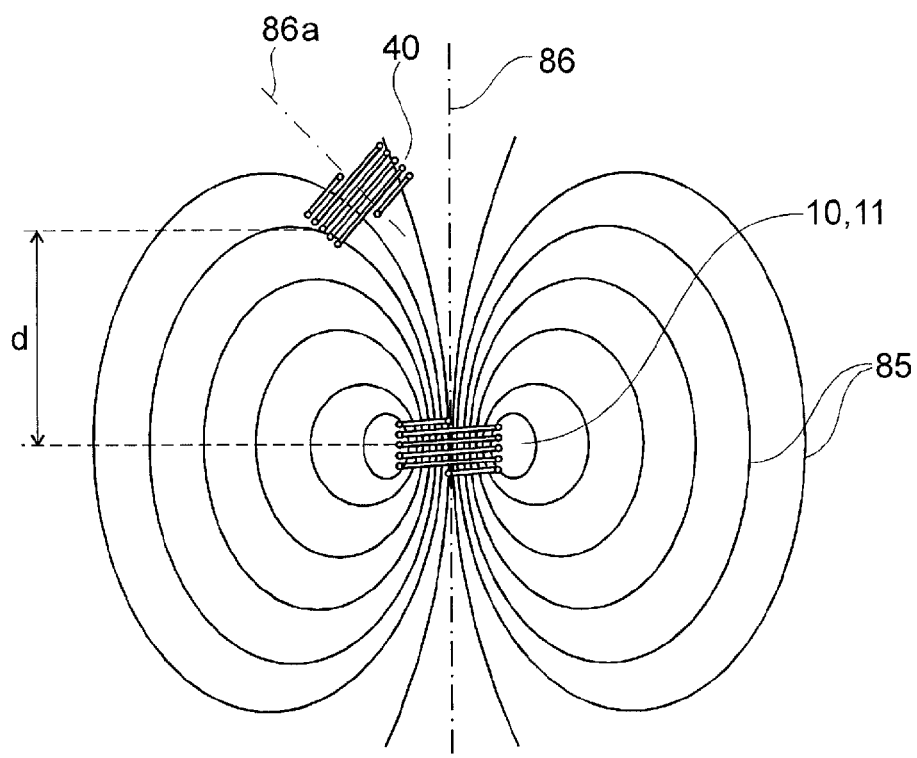
FIG. 5 illustrates an alternative arrangement of a transceiving coil arrangement and a reference coil arrangement according to an exemplary embodiment of the invention.
Figure 6:
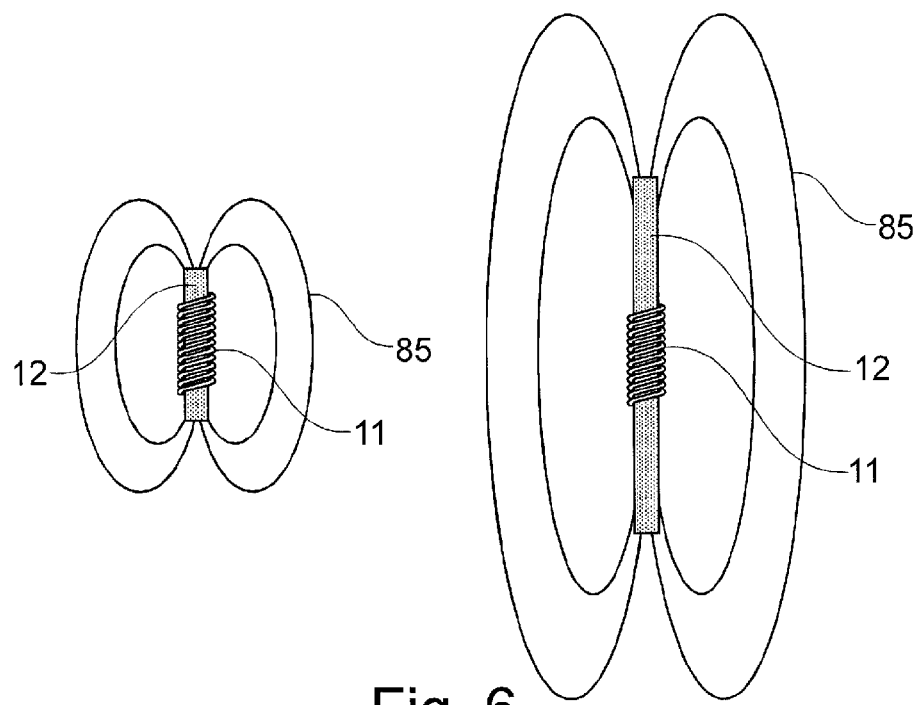
FIG. 6 illustrates two different arrangements of an electromagnet arrangement according to exemplary embodiments of the invention.

FIG. 4 illustrates the electromagnetic field generated by a transceiving coil arrangement 10, 11. The field lines 85 propagate along closed loops. As can be seen from FIG. 4, the density of the magnetic field lines increases when reducing the distance d between the reference coil 40 and the transceiving coil 10. As the magnetic field is inhomogeneous, the induced current or received energy of the reference coil can be used as a characteristic for the distance between the reference coil 40 and the transceiving coil 10. As can be seen from FIG. 5, the density of the field lines 85 is higher when providing the reference coil 40 off-centre of a main axis 86 of the transceiving coil 10, 11. Thus, the sensitivity of the entire device can be increased when providing the reference coil off-centre. It should be noted that the reference coil 40 not only may be placed off-centre, but also may be inclined with respect to the main axis 86. Thus, the field lines 85 more or less run along the longitudinal axis 86a of the reference coil 40, so that the efficiency of the reference coil 40 can be made somewhat higher than in a non-inclined arrangement of the reference coil 40.

The transceiving coil arrangement may also comprise an arrangement of a coil 11 being wound around a magnetic core 12. Thus, the magnetic field lines 85 can be guided by the magnetic core material, so that the electromagnet being formed by the magnetic core 12 and the coil 11 can be provided with distinctive poles as respective starting or end points of the magnetic field lines 85. Thus, the stray flux along the main axis can be kept low.

According to the length of the magnetic core element 12, the character of the magnetic field lines 85, i.e. density can be changed, so that the form of the magnetic core 12 can be used for designing a particular field geometry of the field lines 85.

Figure 7:
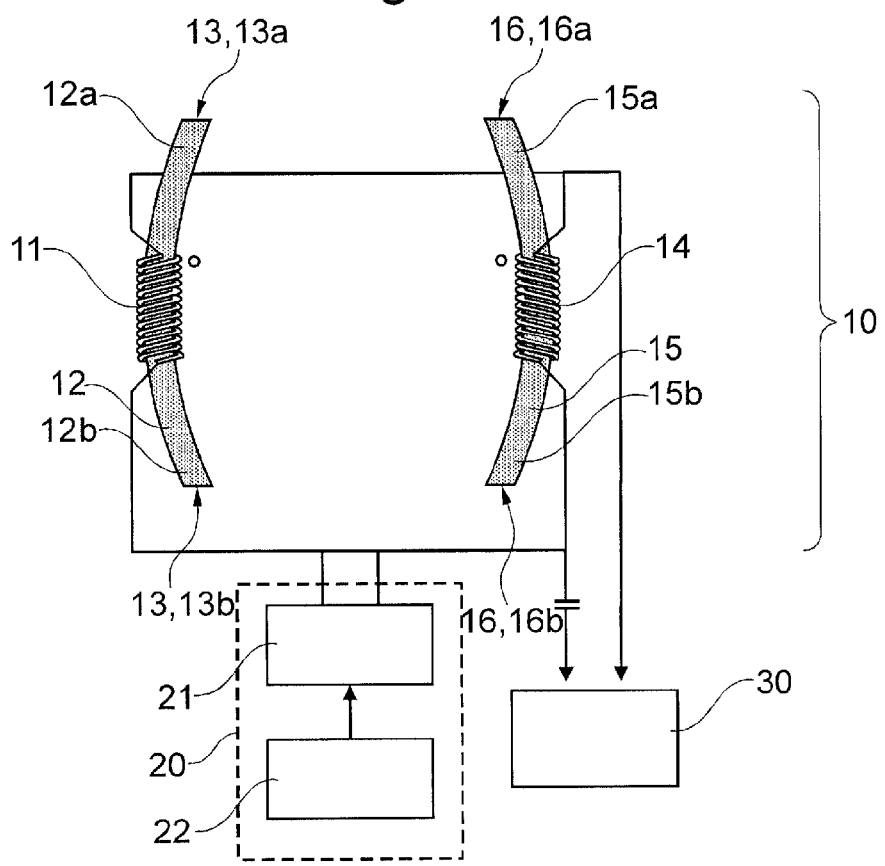
FIG. 7 illustrates an alternative sensor device according to an exemplary embodiment of the invention.

FIG. 7 illustrates a sensor device according to an exemplary embodiment of the invention, wherein the transceiving coil arrangement 10 comprises a first transceiving coil 11 and a second transceiving coil 14. The first transceiving coil 11 is would around a magnetic core element 12, wherein the second transceiving coil 14 is wound around a second magnetic core element 15. Each of the core elements 12, 15 has distinct poles 12a, 12b, 15a, 15b, wherein the coils 11 and 14 are wound counter wise, so that corresponding poles 12a, 15a are positioned adjacently, as well as the corresponding counter poles 12b and 15b. Thus, for example the plus poles 12a, 15a are arranged adjacently, wherein also the minus poles 12b, 15b are positioned adjacently, respectively. Thus, the magnetic field lines starting from the plus poles 12a, 15a propagate so as to end at the respective minus poles 12b, 15b. It should be noted that FIG. 7 does not explicitly illustrate a reference coil arrangement 40. The transceiving coils 11, 14 are driven by the transmitting drive unit 20. The transmitting drive unit 20 may comprise a signal generator 21 and a timing unit 22. The timing unit in this case may be responsible for the correct timing of the predetermined length of the AC power signal and the respective breaks between two subsequent AC power signals of a predetermined length. In the embodiment illustrated in FIG. 7, the receiver unit 30 receives the signal only of one of the transceiving coils 14, so as to avoid the extinction of the received reference signals of the coil 11 and the coil 14. As the transceiving coils 11 and 14 are wound counter wise, the received reference signal would extinct when connecting the receiver unit to the serial connection of the both transceiving coils 11 and 14.

The magnetic core elements 12, 15 may be bended, so as to maintain the space between the magnetic core elements free in order to receive mechanical devices being required for example in an air spring. This may be for example particular faces, which planfully abut to each other when the air spring looses the air pressure. In this case, the abutting surfaces maintain the entire weight of the vehicle to the axis. The bended magnetic core elements 12, 15 allow to provide the sensor device, even if providing respective faces within the air spring abutting to each other when the air spring looses the operational pressure.

The magnetic core elements 12, 15 may be provided with respective end faces 13, 13a, 16, 16a on the one end, and corresponding respective end surfaces 13, 13b, 16, 16b on the other side. When providing the end faces orthogonal to a respective imaginary line between the one end face 13a and the other end face 13b, the end faces are somewhat inclined with respect to the bended magnetic core elements, so as to more precisely guide the magnetic field lines.

Figure 8:
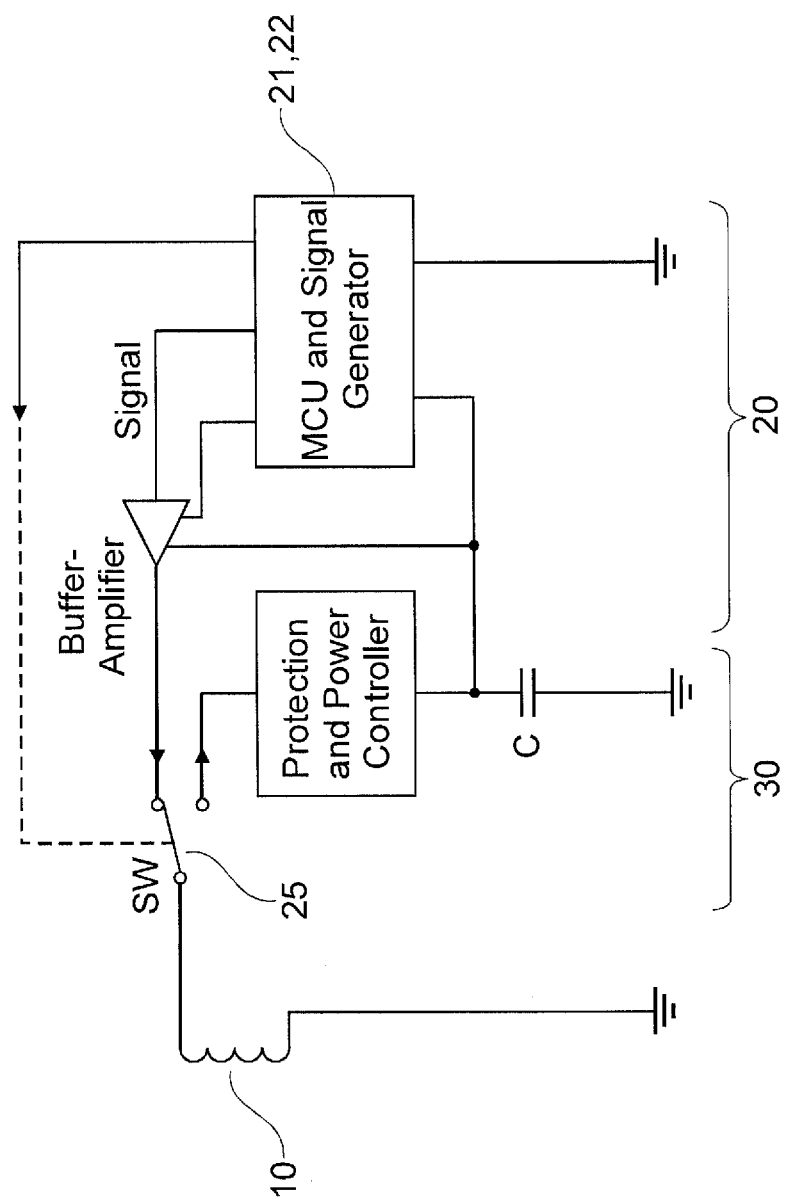
FIG. 8 illustrates a processing circuit according to an exemplary embodiment of the invention.

FIG. 8 illustrates a control circuit for controlling both, the driving of the transceiving coil arrangement by a respective transmitting drive unit 20 and the receiver unit 30. The transmitting drive unit 20 may comprise a timing control circuit 21 as well as a signal generator so as to provide a respective AC power signal via a buffer amplifier and a corresponding switch SW 25 to the transceiving coil arrangement 10. During the transmission of the AC power signal, the switch SW 25 will be in the upper position in order to provide the transceiving coil 10 with an AC power signal from the transmitting drive unit 20, wherein for the break 82 of the AC power signal, the switch 25 will be switched to the lower position in order to receive the reference signal from the transceiving coil 10 and to provide the reference signal to a protection and power controller of the receiver unit 30.

Figure 9:
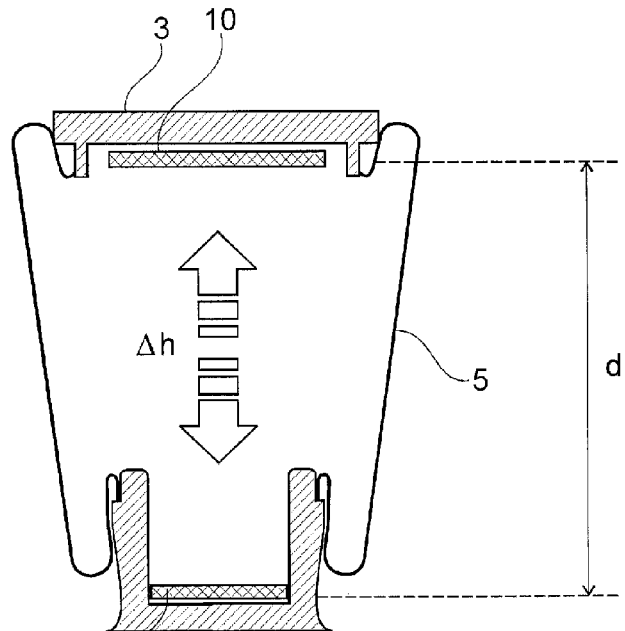
FIG. 9 illustrates an air spring according to an exemplary embodiment of the invention.

FIG. 9 illustrates a cross-sectional view of an air spring having a fixed portion 3 being mountable to a frame of a vehicle, and a movable portion 4. The transceiving coil arrangement 10 is provided to the fixed portion 3, wherein the reference coil arrangement 40 is provided with the movable portion 4. The fixed portion and the movable portion are connected via an air bellow 5, enclosing a pressured space, wherein the pressured space maintains a certain distance d between the fixed portion 3 and the movable portion 4. When driving the vehicle, the moving portion 4 moves upwards and downwards by a certain amount of Δh for a resilient mounting of the movable portion 4 with respect to the fixed portion 3.

Figure 10:
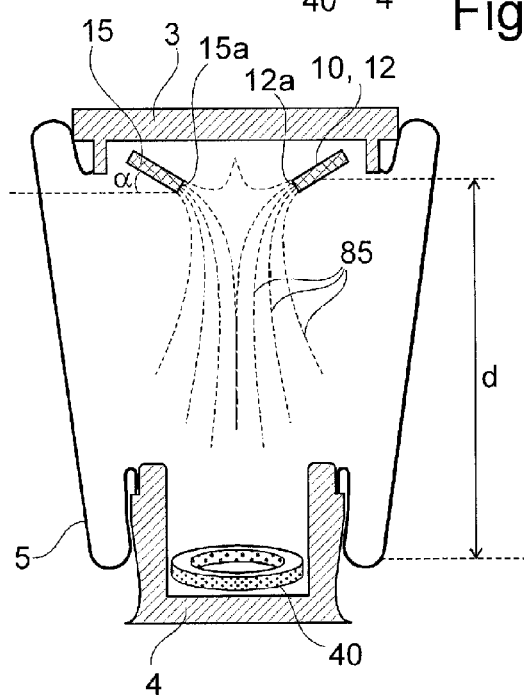
FIG. 10 illustrates an alternative arrangement of a transceiving coil arrangement and a reference coil arrangement according to an exemplary embodiment of the invention.
Figure 11:
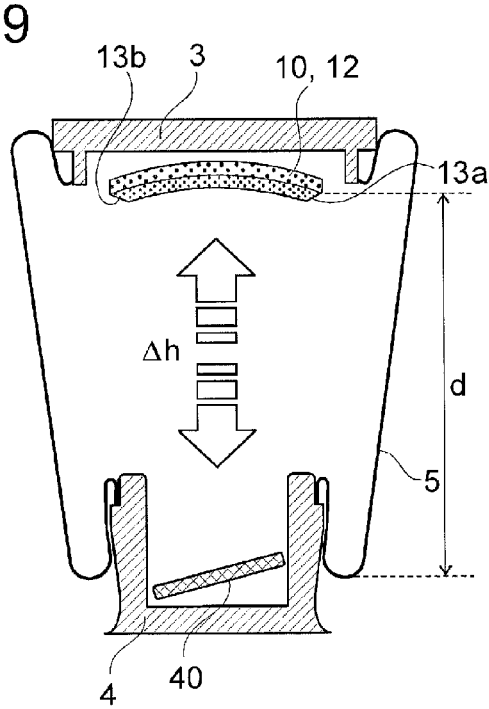
FIG. 11 illustrates an air spring in a side view of FIG. 10 according to an exemplary embodiment of the invention.

As can be seen from FIGS. 10 and 11, the transceiving coil arrangement 10 may also comprise a bended magnetic core element 12. FIG. 10 illustrates a frontal view of the magnetic core elements 12, 15, wherein FIG. 11 illustrates a side view of the same arrangement. As can be seen from FIG. 10, the bended magnetic core elements may also be inclined by an angle α so as to direct the corresponding front faces 13a, 13b downwards in order to support the propagation of the magnetic field towards the reference coil arrangement 40. Thus, the field lines 85 run from the respective front faces 15a, 12a towards the reference coil arrangement 40. As can be seen from FIGS. 10 and 11, also the reference coil 40 may be inclined so as to provide a more sensitive arrangement for the entire sensor device.

Figure 12:
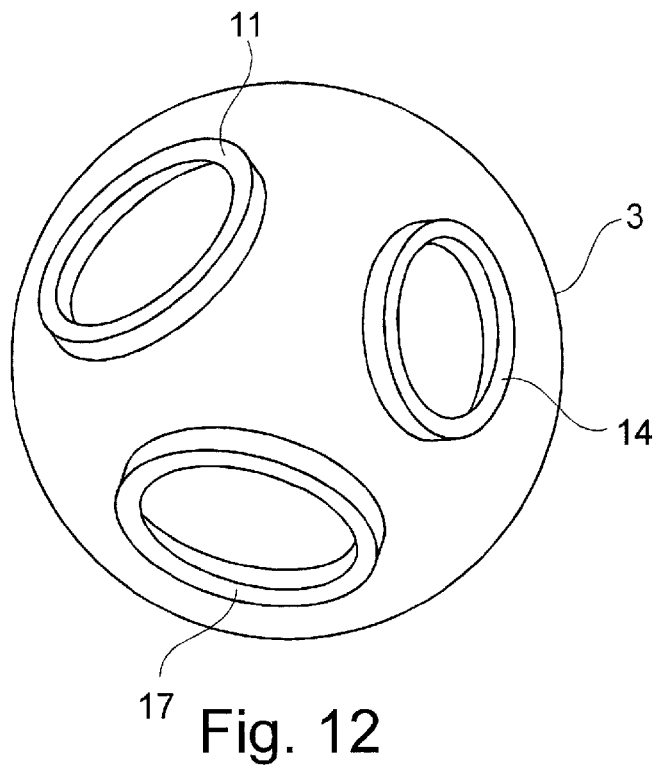
FIG. 12 illustrates a bottom up view onto a fixed part of an air spring according to an exemplary embodiment of the invention.

FIG. 12 illustrates an arrangement of three equally angled transceiving coils 11, 14, 17, which also may be inclined with respect to each other. FIG. 12 illustrates a bottom up view to the fixed portion 3 of the air spring.

Figure 13:
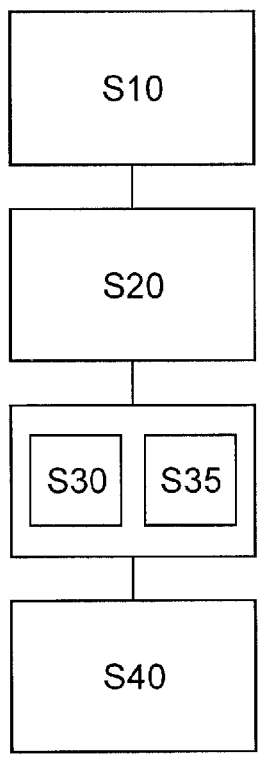
FIG. 13 illustrates a schematic diagram of a method according to an exemplary embodiment of the invention.

FIG. 13 illustrates a schematic overview over the method, according to which the procedure starts with driving S10 a transceiving coil arrangement with an AC power signal of a predetermined duration for generating a magnetic field, followed by accumulating energy S20 by a reference coil arrangement out of the generated magnetic field, and a subsequent generating S30 of a reference signal and supplying S35 of the reference signal to the reference coil arrangement based on an amount of the accumulated energy. This supplied reference signal will be received S40 for outputting a height signal for determining a distance between the transceiving coil arrangement and the reference coil arrangement based on the reference signal and/or the duration of the AC power signal.

Figure 14:
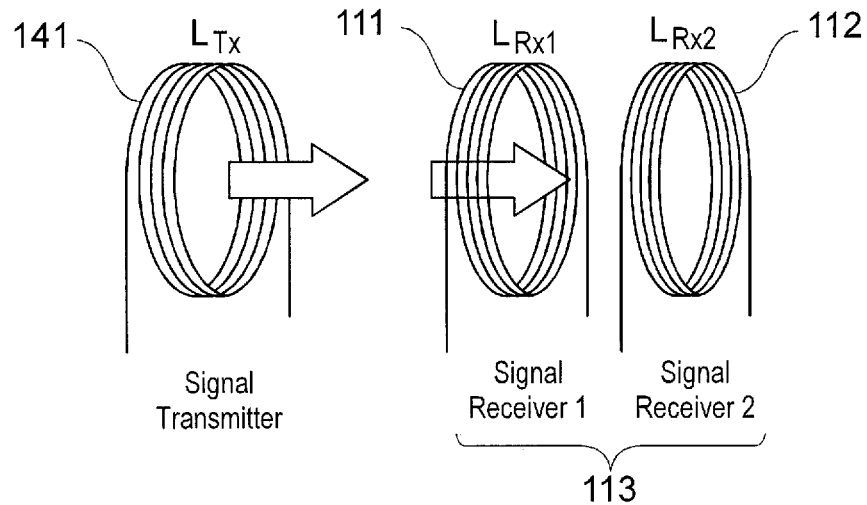
FIG. 14 illustrates a coil arrangement of a signal transmitter coil and two signal receiver coils behind each other according to an exemplary embodiment of the invention.
Figure 15:
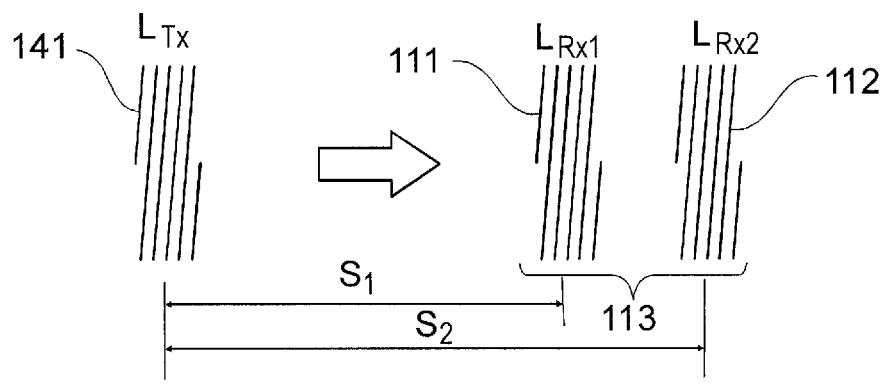
FIG. 15 illustrates a side view of FIG. 14.

FIG. 14 and FIG. 15 illustrates a coil arrangement of a signal transmitter coil and two signal receiver coils behind each other according to an exemplary embodiment of the invention. The sensor device for distance measurement comprises a magnetic field transmitting coil 141, a first magnetic field sensing coil 111 for providing a first magnetic field signal, and a second magnetic field sensing coil 112 for providing a second magnetic field signal. The first and second magnetic field signal is supplied to a computation unit 130. The first magnetic field sensing coil and the second magnetic field sensing coil are orientated to each other in a fixed predetermined manner to form a magnetic field sensing unit 113. The magnetic field transmitting coil 141 is movable with respect to the magnetic field sensing unit 113. The first magnetic field sensing coil and the second magnetic field sensing coil are coupled to the computation unit for providing the first magnetic field signal and the second magnetic field signal, respectively, with the computation unit, so that the computation unit may determine a relation between the first magnetic field signal and the second magnetic field signal as an indicative of the distance between the magnetic field transmission coil and the magnetic field sensing unit. The sensing coils may also be replaced by e.g. a hall sensor or any other magnetic field sensitive device. The transmission coil may also be replaced by a permanent magnet.

Two signal receiving coils 111, 112 are placed at "different", but constant to each-other distance in relation to the magnetic signal transmitting coil. Using such signal receiving coil arrangement it is no longer necessary to relay on the "absolute" signal amplitude measurement from one receiving coil, but relying on a signal-ratio difference when comparing the signal-strength difference from the two signal receivers. Benefits of a Differential Mode, Magnetic-Signal Operating Height Sensor are independent to signal amplitude variations, independent to operating temperature changes or variations, independent to electronic component tolerances, resistant to many different type of interferences caused by metallic or ferro-magnetic objects that may be placed near, or even "in" the height sensor unit, some rejection capability when metallic objects are placed purposely or by accident inside the height sensor between the reference device LRD and the LTR-Device of FIG. 1.

This sensor design will work also when the coil designs may differ between the two receiving coils (coil diameter, number of windings, full body or pan-cake-coils, etc). Important is only that the distance between the signal receiving coil 1 to the signal transmitting coil is different to the one from the signal receiving coil 2, i.e. that the distance is different along the moving trajectory. Also important is that the mechanical design (arrangement) that is responsible for the location difference between the two receiving coils 1 and 2 remains constant (is not changing) in a given sensor system design.

The physical location difference between the receiving coils 111 and 112 has to be large enough so that the signal processing electronics can measure clearly a signal amplitude difference that is generated through both signal receiving coils.

The diameter and the number of turns of the transmitter and receiver coil design decides about the measured signal amplitude, meaning: more turns=more signal amplitude; and larger diameter=more signal amplitude. This is true for both coil types: the transmitter coil and the receiver coil design. However, when changing the coil design then the inductivity of the coil will change too, and with this the optimal operational frequency.

FIG. 14 illustrates a principle coil arrangement of a height sensor, consisting of one signal transmitting coil 141, LTx and two signal receiving coils 111, LRx1 and 112, LRx2. In this coil arrangement all three coils are placed along the same axis. While other coil arrangements are possible, some of which are described later, the following is focusing on a coil arrangement where the two receiving coils LRx1 and LRx2 have a fixed axial distance or axial spacing between each other that will not be changed during the operation of this sensor. This two-coil receiver-module can then change its distance or spacing in relation to the signal transmitting coil (here called: measurement range) in axial direction.

FIG. 15 illustrates a graphical simplification of FIG. 14 and represents the three coils needed in a differential-mode, magnetic height or distance sensor, in a side-view. When comparing the signals received by the two receiving coils 111, 112 the signal amplitude ration is a function of the distance difference between a): the receiving coil 111 to transmitting coil 141, and b): the receiving coil 112 to the transmitting coil 141. The larger the fixed (constant) spacing between the two receiver coils will be, the larger the measurement ratio signal will be.

The sensor device for distance measurement may be implemented as described with respect to FIGS. 1 and 7. Thus, the sensor device may comprise a transceiving coil arrangement 10 comprising the first magnetic field sensing coil 111 for providing a first magnetic field signal and the second magnetic field sensing coil 112 for providing a second magnetic field signal. The transceiving coil arrangement 10 is coupled to both, the transmitting drive circuit 20 and the receiver unit 30 comprising the computation unit 130. The reference control unit 50 is coupled to the reference coil arrangement 40 comprising the magnetic field transmitting coil 141. The reference coil arrangement is movably positioned with respect to the transceiving coil arrangement. The drive unit is adapted to drive the transceiving coil arrangement with an AC power signal 80 of a predetermined duration 81 for generating a magnetic field 85, as already described with respect to FIGS. 2 and 3. The reference control unit accumulates energy out of the generated magnetic field and generates a reference signal 90 based on an amount of the accumulated energy. The receiver unit receivs the reference signal and outputs a signal 91 for determining a distance or height between the transceiving coil arrangement and the reference coil arrangement based on the reference signal and/or the duration of the AC power signal.

Figure 16:
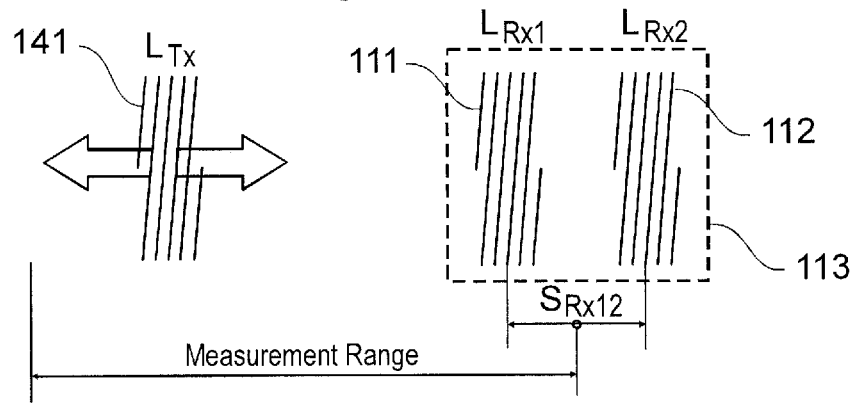
FIG. 16 illustrates the principal function of the coil arrangement of FIG. 14.

FIG. 16 illustrates the principal function of the coil arrangement of FIG. 14. In this design proposal the transmitter coil module 141 (in other documentation often referred to as the Reference Device) is moving forward and backward in relation to the receiver module 113. The spacing between the two receiving coils has to remain constant while the spacing from the two receiving coils (called: receiver module) in relation to the transmitter coil will change. The larger the spacing SRX12 between the two receiver coils will be, the larger the signal differences generated by the two receiver modules will be. This will improve the signal-to-noise ratio. However, the drawback of such a design is that the receiver module will become larger and will require more space in the application where it will be used. Consequently it is advisable that for each different application the optimal spacing between the two receiver coils has to be identified first.

Figure 17:
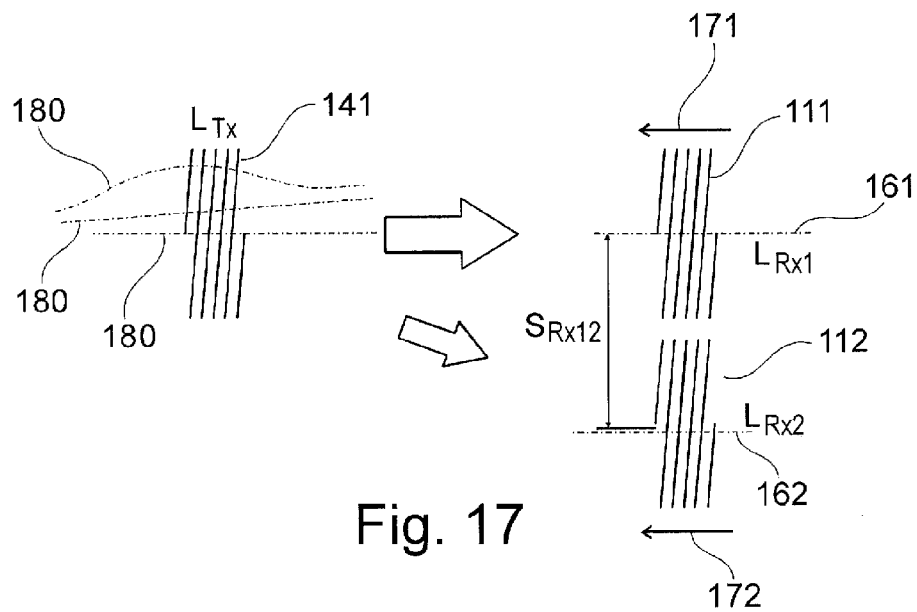
FIG. 17 illustrates a further embodiment of a coil arrangement of a signal transmitter coil and two signal receiver coils side by side according to an exemplary embodiment of the invention.

FIG. 17 illustrates a further embodiment of a coil arrangement of a signal transmitter coil and two signal receiver coils side by side according to an exemplary embodiment of the invention. In this "Differential Mode" height or distance sensor design the two receiver coils are placed at the same plane, side-by-side. The benefit of such a design is that it needs not much design-depth and may be better applicable where space is a premium. When using a side-by-side receiver coil design the spacing between the centres of the two receiver coils decides about the signal-difference received from the transmitter coil. One added bonus of this design is that the signal generated by the receiving coil 112, LRx2 (the coil that is not in-line with the transmitting coil) will be much more linear that from the coil 111, LRx1. Meaning that the signal dynamic in relation to the available (or usable) measurement range is more preferable. The larger the spacing SRx12 is (between the effective centres of the two receiver coils used) the larger the differential-mode signal will be (improved signal-to-noise ratio).

The magnetic field transmitting arrangement 141 is movable with respect to the magnetic field sensing unit 113 along a predetermined trajectory 180. This trajectory may be linear or curved, as can be seen from FIG. 17.

The first magnetic field sensing coil 111 and the second magnetic field sensing coil 112 have corresponding main receiving directions 171, 172, but may be on different parallel axes, as illustrated in FIG. 17.

Figure 18:
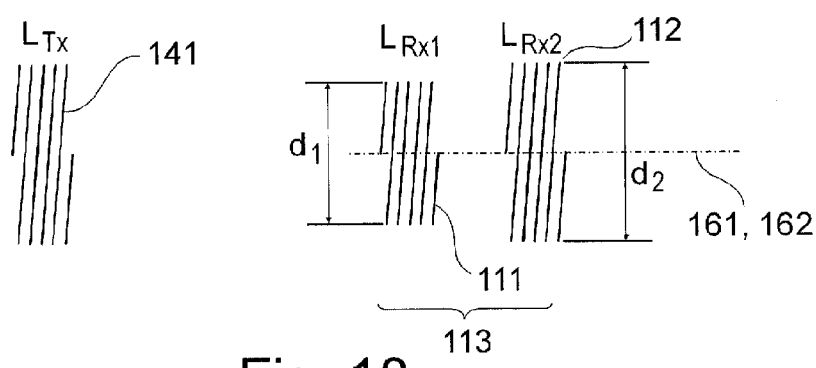
FIG. 18 illustrates a further embodiment of a coil arrangement of a signal transmitter coil and two signal receiver coils behind each other having different diameters according to an exemplary embodiment of the invention.

FIG. 18 illustrates a further embodiment of a coil arrangement of a signal transmitter coil and two signal receiver coils behind each other having different diameters according to an exemplary embodiment of the invention. The first magnetic field sensing coil 111 and the second magnetic field sensing coil 112 have a corresponding main receiving axis 161, 162, like in FIGS. 14, 15, 16 and 18.

Figure 19:
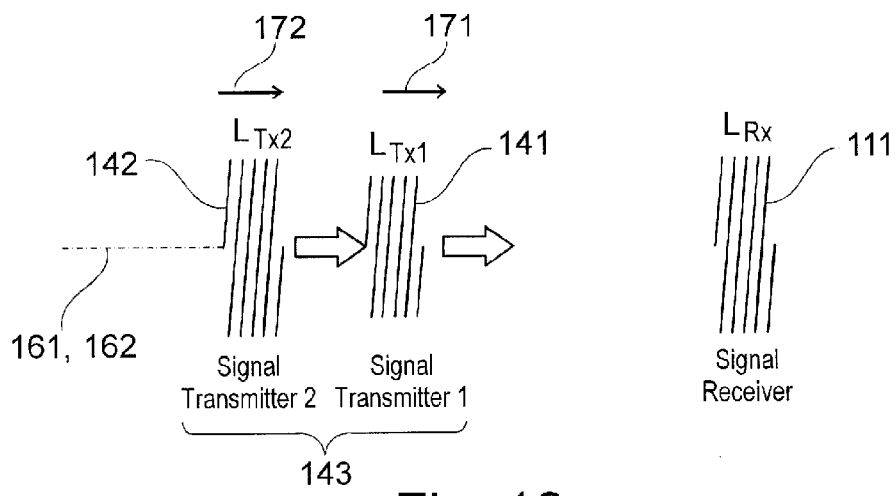
FIG. 19 illustrates a coil arrangement of two signal transmitter coils behind each other and a signal receiver coil according to an exemplary embodiment of the invention.

FIG. 19 illustrates a coil arrangement of two signal transmitter coils behind each other and a signal receiver coil according to an exemplary embodiment of the invention. The sensor device for distance measurement comprises a first magnetic field transmitting coil 141 for providing a first magnetic field and a second magnetic field transmitting coil 142 for providing a second magnetic field, as well as a magnetic field sensing coil 111 for providing a first magnetic field signal according to the first magnetic field and a second magnetic field signal according to the second magnetic field. The first magnetic field transmitting coil and the second magnetic field transmitting coil are orientated to each other in a fixed predetermined manner to form a magnetic field transmitting unit 143. The magnetic field transmitting unit 143 is movable with respect to the magnetic field sensing arrangement 111. The magnetic field sensing coil is coupled to a computation unit 130 for providing the first magnetic field signal and the second magnetic field signal with the computation unit so as to determine a relation between the first magnetic field signal and the second magnetic field signal, wherein the relation is an indicative of the distance or height between the magnetic field transmission unit 143 and the magnetic field sensing coil 111. The magnetic field transmitting unit 143 is movable with respect to the magnetic field sensing coil 111 along a predetermined trajectory 180. The first magnetic field transmitting coil 141 and the second magnetic field transmitting coil 142 have corresponding main transmitting directions 171, 172 and in FIG. 19 also corresponding main receiving axes 161, 162. Although not illustrated, the both coils 141 and 142 may also be located side by side in analogy to the sensing coils 111, 112 in FIG. 17.

FIG. 19 illustrates a reverse design with only one receiver coil and two transmitter coils. The transmitter coils 141, LTx1 and 142, LTx2 are placed with a different spacing to each other (in relation to the receiving coil). The signals received by the receiver coil will have different signal amplitude. Under normal circumstances the signal amplitude used by the transmission from LTx1 will be larger than from the transmitter coil LTx2 (this is true as long as both transmitter coils are of the same specifications and are fed with the same signal (in frequency and in amplitude). However, when using this specific design either the transmitter coils have to by powered in sequence only (one after the other) or they have to be driven by two different signal frequencies (when running at the same time). There are alternative operational modes possible which are not part of this specific description.

The sensor device for distance measurement may be implemented into a sensor device which has been described with respect to FIGS. 1 and 7. Thus, the sensor device may comprise a transceiving coil arrangement 10 comprises the magnetic field sensing arrangement 111 for providing the first magnetic field signal according to the first magnetic field and the second magnetic field signal according to the second magnetic field The transceiving coil arrangement 10 is coupled to both, the transmitting drive circuit 20 and the receiver unit 30 comprising the computation unit 130. The reference control unit 50 is coupled to the reference coil arrangement 40 the first magnetic field transmitting arrangement 141 for providing the first magnetic field and the second magnetic field transmitting arrangement 142 for providing the second magnetic field. The reference coil arrangement is movably positioned with respect to the transceiving coil arrangement. The drive unit is adapted to drive the transceiving coil arrangement with an AC power signal 80 of a predetermined duration 81 for generating a magnetic field 85, as already described with respect to FIGS. 2 and 3. The reference control unit accumulates energy out of the generated magnetic field and generates a reference signal 90 based on an amount of the accumulated energy. The receiver unit receives the reference signal and outputs a signal 91 for determining a distance or height between the transceiving coil arrangement and the reference coil arrangement based on the reference signal and/or the duration of the AC power signal.

FIG. 20 illustrates a principal parallel signal processing according to an exemplary embodiment of the invention. The measurement signal computation is done using a digital microprocessor unit. In this FIG. 20 each receiver coil has its own signal conditioning module attached (signal buffering, signal filtering, signal amplification). This solution allows very fast measurements (very responsive height sensor design).

FIG. 21 illustrates a principal multiplexed signal processing according to an exemplary embodiment of the invention. When using a multiplex capable receiver circuit then only ONE buffer circuit, ONE amplifier, and ONE filter circuit will be required. This has the benefit that when component tolerances or the operating temperature is changing the specifications of the buffer-filter-amplifier circuit then the effect applies equally to both receiver coil signals. This design ma have a less faster working as a parallel circuit design as shown in FIG. 20. However, with the very fast components available today this may not be an issue at all for most applications.

Figure 22:
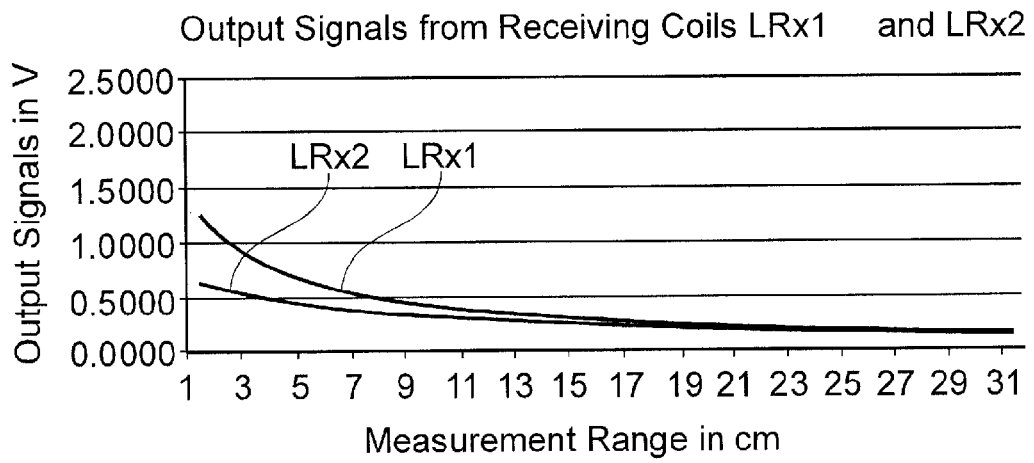
FIG. 22 to FIG. 24 illustrate exemplary relations of signals over measurement distance.
Figure 23:
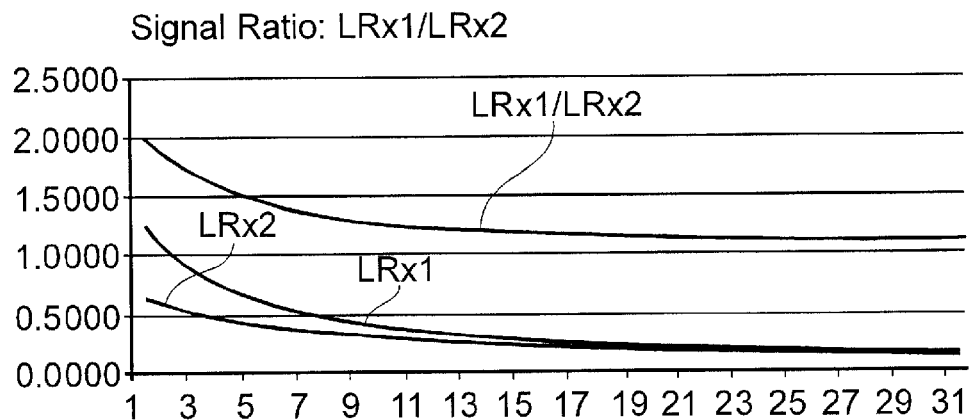
Figure 24:
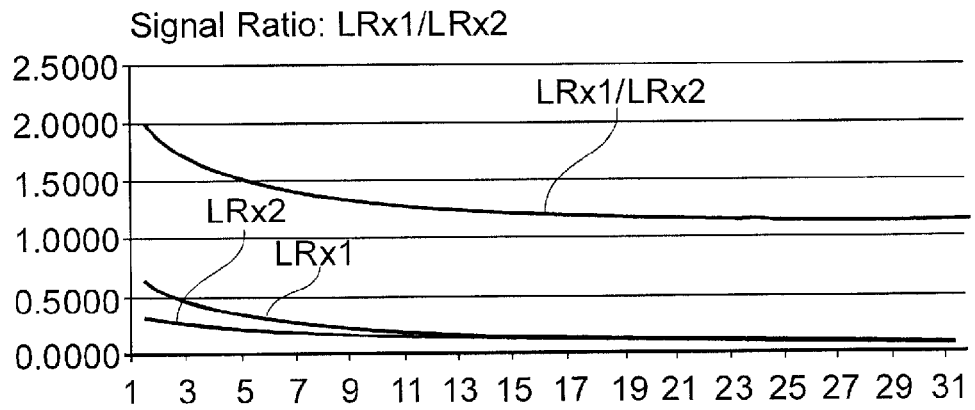

FIG. 22 to FIG. 24 illustrate exemplary relations of signals over measurement distance. When looking at the analogue output signal, generated by the Receiver Module LRx1 then the signal behaves as shown in FIG. 22. The smaller the spacing between the transmitter 141, 142, 143, LTx and the receiver 111, 112, 113, LRx1, exponentially larger is the output signal. The second receiving coil 112, LRx2 has a larger distance to the transmitter coil 141, LTx then the receiving coil 111, LRx1. Therefore the signal will follow the same exponential principle but will be somewhat weaker.

Taking the signal ration of 111, LRx1 and 112 LRx2 (ratio=LRx1/LRx2) results in a third (upper) curve in FIG. 23, that will remain unchanged even when the absolute signal amplitudes of LRx1 and LRx2 may change, for whatever reasons. FIG. 24 illustrates that the height or distance sensor output signal (LRx1/LRx2) remains unaffected when the absolute signal amplitudes of the two receiver signals (LRx1 and LRx2) will be halved, for example. The main difference will be that the signal-to-noise ration may be worsen (the sensors output signal will become more noisy when the input signals become too small).

Figure 25:
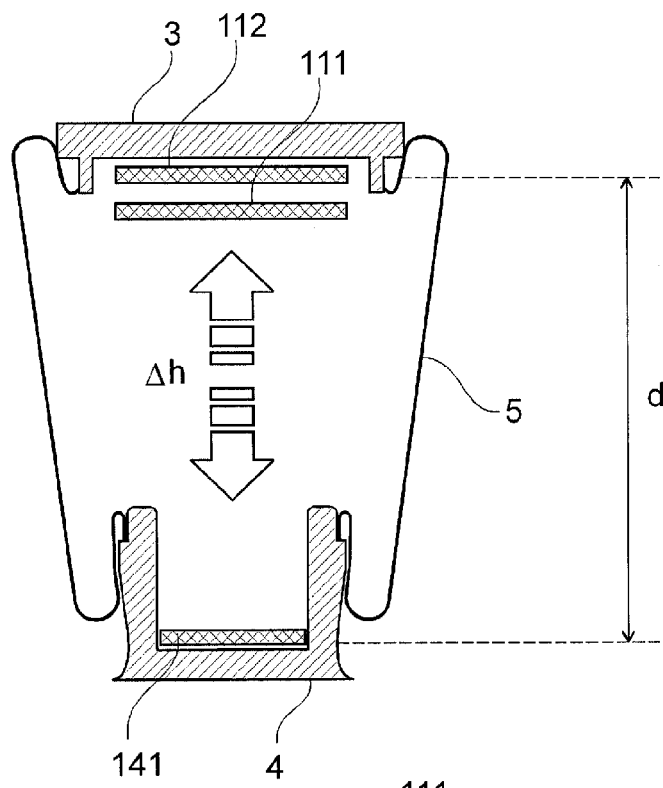
FIG. 25 illustrates an air spring with a coil arrangement of a signal transmitter coil and two signal receiver coils behind each other according to an exemplary embodiment of the invention.

FIG. 25 illustrates an air spring with a coil arrangement of a signal transmitter coil and two signal receiver coils behind each other according to an exemplary embodiment of the invention. The air spring for a vehicle comprises a fixed part 3 and a movable part 4, and the sensor device above described with respect to FIG. 14, wherein the two receiver coils 111, 112, the transmitting drive unit 20 and the receiver unit 30 are arranged at the fixed part of the air spring and the transmitter coil 141 and the reference control unit 50 are arranged at the moveable part.

Figure 26:
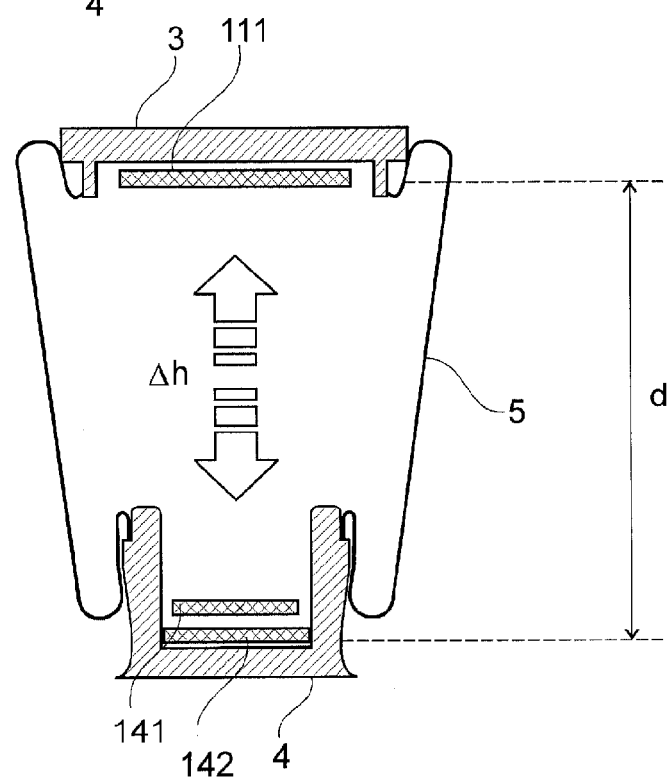
FIG. 26 illustrates an air spring with a coil arrangement of two signal transmitter coils behind each other and a signal receiver coil according to an exemplary embodiment of the invention.

FIG. 26 illustrates an air spring with a coil arrangement of two signal transmitter coils behind each other and a signal receiver coil according to an exemplary embodiment of the invention. The air spring for a vehicle comprises a fixed part 3 and a movable part 4, and the sensor device above described with respect to FIG. 19, wherein the receiver coil 111, the transmitting drive unit 20 and the receiver unit 30 are arranged at the fixed part of the air spring and the two transmitter coils 141, 142 and the reference control unit 50 are arranged at the moveable part.

The sensor device can use pan-cake. i.e. spiral would coil design on a flat (one or two layer) PCB (Printed Circuit Board). The sensor has a maximum usable movement range available between the transmitter and the receiver modules, and further has an improved signal linearity and with this a more optimal usage of the ADC (Analogue-Digital-Converter) measurement range.

There are several options available about how the transmitter module may work. Whatever the chosen operation mode may be, the differential-mode design descriptions from above apply to all of them. Some of the transmitter module design choices are that the transmitter module is powered by its own electrical power supply. This will result in a much wider measurement range (in centimeter). This also requires that at least two electrical wires have to be fed to the transmitter module or a wireless power supply, which may not be possible in all different applications. The transmitter module may also be powered by the electrical energy received from the receiver coils. This means that the receiver coils have to emit actively a magnetic field that can be received by the transmitter circuit. Choosing this design presents itself with a number of different options, covering the "absorption" principle, the "resonance" principle, generating power (to power an independent working transmitter circuit), or other methods.

To simplify the height sensor system design it is possible to emit the transmitter signal (LTx) with two or more different signal amplitudes. Because of the exponential output signal character (receiver modules) the absolute "height" or "distance" measurement range may be too limited for some applications. To overcome this challenge (in order to expand the measurement range) the transmitter module can sent out burst of a weak signal followed by a burst of a stronger signal. The receiver units will then look-on that portion of the transmitter signal that is providing the optimal signal quality. Example: If the lower-level transmitter signal amplitude is too weak for a high quality height measurement, then the receiver electronic is focusing on the high-level transmitter signal amplitude only. It may be of relevance that no matter what transmitter signal amplitude is the optimal value for the receiver system, both receiver signal measurements (LRx1 and LRx2) have to be done looking at the same transmitter signal amplitude. By doing so there will be no need for maintaining a known transmitter signal amplitude ratio between the low and the high level signals. It does not matter what the transmitter signal amplitude ratio changes may be, as long as they are kept constant for a relative short time.

In reverse, if the high-level transmitter signal may push one or both receiver modules (LRx1, LRx2) in saturation (as the signal may be too strong), then both receiver modules will focus on the lower-level signal amplitudes.

The above described linear position sensor design (here called "Height Sensor") has been specifically developed and adapted for air-spring applications. Air-springs are increasingly in use in commercial trucks and coaches (public and private busses), but also in luxury cars and comfort rail-road application. Besides the air-spring device the differential-mode magnetic height sensor system can be used in all types of suspension systems. Alternative applications are elevators where the exact spacing (distance) to the upper end (under the roof) or the bottom end (in the basement) need to be identified in order to stop the elevator before hitting the emergency buffers.

The here described differential mode height sensor can be used where other sensor systems fail to function properly (ultra sonic, optical, capacitive, potentiometer, pressure . . . ) as this system is virtually insensitive to changes of most physical operational parameters. The system may be insensitive to changes in the operating temperature range (valid for the traditional industrial temp range), insensitive to air pressure changes (difficult for ultrasonic sensors), insensitive to humidity and dust/dirt (difficult for optical sensors), insensitive to mechanical vibrations (difficult for potentiometer type sensor solutions), insensitive to assembly tolerances and electronic component tolerances/drifts, and not dependant on changes in hydraulic or pneumatic pressure (pressure measuring sensor systems). The here described sensor solution is specifically designed for out-door applications that have to function under rough and harsh operating conditions.

It should be noted that the term "comprising" does not exclude other elements or steps and the "a" or "an" does not exclude a plurality. Also elements described in association with different embodiments may be combined.

It should be noted that the reference signs in the claims shall not be construed as limiting the scope of the claims.

The invention claimed is:

1. A sensor device for a height measurement, comprising:
    a transceiving coil arrangement including at least one transceiving coil;
    a transmitting drive unit;
    a receiver unit;
    a reference coil arrangement; and
    a reference control unit,
    wherein the transceiving coil arrangement is coupled to both the transmitting drive circuit and the receiver unit,
    wherein the reference control unit is coupled to the reference coil arrangement,
    wherein the reference coil arrangement is movably positioned with respect to the transceiving coil arrangement,
    wherein the drive unit is adapted to drive the transceiving coil arrangement with an AC power signal of a predetermined duration for generating a magnetic field,
    wherein the reference control unit is adapted for accumulating energy out of the generated magnetic field and for generating a reference signal based on an amount of the accumulated energy, and
    wherein the receiver unit is adapted for receiving the reference signal and for outputting a signal for determining a distance between the transceiving coil arrangement and the reference coil arrangement based on at least one out of a group, the group consisting of the reference signal and the duration of the AC power signal.

2. The sensor device according to claim 1, wherein the reference control unit is adapted for receiving supply energy from the generated magnetic field for generating and supplying the reference signal.

3. The sensor device according to claim 1, wherein the reference coil arrangement is located off-centre of a main axis of the magnetic field generated by the transceiving coil arrangement.

4. The sensor device according to claim 1, wherein the transceiving coil arrangement comprises a plurality of equally angulated transceiving coils.

5. The sensor device according to claim 1, wherein at least a part of transceiving coils of the transceiving coil arrangement is inclined with respect to the main axis of the reference coil arrangement.

6. The sensor device according to claim 1, wherein at least a part of the transceiving coils of the transceiving coil arrangement is wound around a magnetic core.

7. The sensor device according to claim 1, wherein the transceiving coil arrangement comprises two transceiving coils, each wound around a separate magnetic core for providing two electro magnets, wherein the magnetic cores are bended, wherein corresponding poles of the both electro magnets are arranged adjacently.

8. The sensor device according to claim 7, wherein at least a part of the magnetic cores have two end faces, wherein the two end faces are substantially orthogonal with respect to an imaginary line between the two end faces.

\* \* \* \* \*